United States Patent
Shen et al.

(10) Patent No.: US 12,020,347 B2
(45) Date of Patent: Jun. 25, 2024

(54) METHOD AND APPARATUS FOR TEXT EFFECT PROCESSING

(71) Applicant: BEIJING BYTEDANCE NETWORK TECHNOLOGY CO., LTD., Beijing (CN)

(72) Inventors: Yanhao Shen, Beijing (CN); Guangyao Ni, Beijing (CN); Hui Yang, Beijing (CN)

(73) Assignee: BEIJING BYTEDANCE NETWORK TECHNOLOGY CO., LTD., Beijing (CN)

( * ) Notice: Subject to any disclaimer, the term of this patent is extended or adjusted under 35 U.S.C. 154(b) by 188 days.

(21) Appl. No.: 17/631,889

(22) PCT Filed: Jul. 29, 2020

(86) PCT No.: PCT/CN2020/105439
§ 371 (c)(1),
(2) Date: Jan. 31, 2022

(87) PCT Pub. No.: WO2021/018178
PCT Pub. Date: Feb. 4, 2021

(65) Prior Publication Data
US 2022/0292731 A1 Sep. 15, 2022

(30) Foreign Application Priority Data
Aug. 1, 2019 (CN) .......................... 201910708527.2

(51) Int. Cl.
*G06T 11/00* (2006.01)
*G06T 3/02* (2024.01)
*H04L 67/60* (2022.01)

(52) U.S. Cl.
CPC ............... *G06T 11/00* (2013.01); *G06T 3/02* (2024.01); *H04L 67/60* (2022.05)

(58) Field of Classification Search
None
See application file for complete search history.

(56) References Cited

U.S. PATENT DOCUMENTS

| | | | |
|---|---|---|---|
| 2005/0191035 A1 | 9/2005 | Jung et al. | |
| 2008/0037948 A1* | 2/2008 | Yahata | G11B 20/00753 |

FOREIGN PATENT DOCUMENTS

| | | |
|---|---|---|
| CN | 101854377 A | 10/2010 |
| CN | 102984467 A | 3/2013 |

(Continued)

OTHER PUBLICATIONS

International Patent Application No. PCT/CN2020/105439; Int'l Search Report; dated Nov. 3, 2020; 2 pages.

*Primary Examiner* — Yanna Wu
(74) *Attorney, Agent, or Firm* — BakerHostetler (57) ABSTRACT

A method and an apparatus for text effect processing, an electronic device, and a computer readable storage medium. The method comprises: sending to a server a request to acquire a text effect resource, the text effect resource being used to implement a display effect of text associated with multimedia; receiving a text effect resource sent by the server; and on the basis of the text effect resource, performing effect processing on text, causing the text to be displayed on a terminal screen following playback progress of the multimedia, and gradually disappear from the terminal screen.

15 Claims, 3 Drawing Sheets

---

Transmit a request for obtaining a text effect resource to a server, where the text effect resource is used for realizing a display effect of texts associated with a multimedia — S11

Receive the text effect resource from the server — S12

Perform effect processing on the texts based on the text effect resource to gradually display the texts on a screen of a terminal with a playback progress of the multimedia and gradually disappear the texts from the screen of the terminal — S13

(56) References Cited

FOREIGN PATENT DOCUMENTS

| | | |
|---|---|---|
| CN | 103179093 A | 6/2013 |
| CN | 107943964 A | 4/2018 |
| CN | 107944397 A | 4/2018 |
| CN | 109889741 A | 6/2019 |

* cited by examiner

METHOD AND APPARATUS FOR TEXT EFFECT PROCESSING

The present application is the national phase application of PCT International Patent Application No. PCT/CN2020/105439, filed on Jul. 29, 2020 which claims the priority to Chinese Patent Application No. 201910708527.2, titled "METHOD AND APPARATUS FOR TEXT EFFECT PROCESSING", filed on Aug. 1, 2019 with the Chinese Patent Office, both of which are incorporated herein by reference in their entireties.

FIELD

The present disclosure relates to the technical field of image processing, and in particular to a method and an apparatus for text effect processing, and a computer readable storage medium.

BACKGROUND

For text design, what is often mentioned in conventional user interface design is the font paradigm, focusing on the shapes of the texts. Text effects are rarely mentioned. However, with the popularity of simple design, if the texts can be "moved", a single graphic page will immediately "live", thereby achieving a special user visual experience.

According to the conventional technology, a version of application corresponds to a type of text effect, that is, a determined version of application corresponds to a determined type of text effect. For example, a fixed type of text effect is included in a current version of application, and other new text effects cannot be added. New text effects can be added in the application only by updating the version of the application, which is very inflexible.

SUMMARY

The content part of the present disclosure is provided to introduce concepts in a brief form, and these concepts are to be described in detail in the following embodiments. The content of the present disclosure is not intended to identify the key features or essential features of the claimed technical solutions, nor is it intended to be used to limit the scope of the claimed technical solutions.

According to the present disclosure, a method for text effect processing is provided to at least partially solve the technical problem of inflexible text effects in the conventional technology. In addition, an apparatus for text effect processing, a hardware device for text effect processing, a computer readable storage medium, and a terminal for text effect processing are further provided.

To achieve the above objectives, a method for text effect processing is provided according to an aspect of the present disclosure. The method includes: transmitting a request for obtaining a text effect resource to a server, where the text effect resource is used for realizing a display effect of texts associated with a multimedia; receiving the text effect resource from the server; and performing effect processing on the texts based on the text effect resource to gradually display the texts on a screen of a terminal with a playback progress of the multimedia and gradually disappear the texts from the screen of the terminal.

To achieve the above objectives, a method for text effect processing is provided according to an aspect of the present disclosure. The method includes: receiving a request for obtaining a text effect resource from a client, where the text effect resource is used for realizing a display effect of texts associated with a multimedia; and transmitting the text effect resource to the client, where the client performs effect processing on the texts based on the text effect resource to gradually display the texts on a screen of a terminal with a playback progress of the multimedia and gradually disappear the texts from the screen of the terminal.

To achieve the above objectives, an apparatus for text effect processing is provided according to an aspect of the present disclosure. The apparatus includes a request transmission module, a resource reception module, and an effect display module. The request transmission module is configured to transmit a request for obtaining a text effect resource to a server, where the text effect resource is used for realizing a display effect of texts associated with a multimedia. The resource reception module is configured to receive the text effect resource from the server. The effect display module is configured to perform effect processing on the texts based on the text effect resource to gradually display the texts on a screen of a terminal with a playback progress of the multimedia and gradually disappear the texts from the screen of the terminal.

To achieve the above objectives, an apparatus for text effect processing is provided according to an aspect of the present disclosure. The apparatus includes a request reception module and a resource transmission module. The request reception module is configured to receive a request for obtaining a text effect resource from a client, where the text effect resource is used for realizing a display effect of texts associated with a multimedia. The resource transmission module is configured to transmit the text effect resource to the client, where the client performs effect processing on the texts based on the text effect resource to gradually display the texts on a screen of a terminal with a playback progress of the multimedia and gradually disappear the texts from the screen of the terminal.

To achieve the above objectives, an electronic device is provided according to an aspect of the present disclosure. The electronic device includes a memory and a processor. The memory stores non-transitory computer readable instructions. The processor is configured to perform, when executing the computer readable instructions, any of the methods for text effect processing described above.

To achieve the above objectives, a computer readable storage medium is provided according to an aspect of the present disclosure. The computer readable storage medium stores non-transitory computer readable instructions. The non-transitory computer readable instructions, when executed by a computer, cause the computer to perform any of the methods for text effect processing described above.

To achieve the above objectives, a terminal for text effect processing is provided according to another aspect of the present disclosure. The terminal for text effect processing includes any of the apparatuses for text effect processing described above.

In the embodiments of the present disclosure, the text effect resource is obtained from the server, and effect processing is performed on the texts based on the text effect resource to gradually display the texts on the screen of the terminal with the playback progress of the multimedia and gradually disappear the texts from the screen of the terminal. According to the present disclosure, the text effects resource can be obtained without updating the client, thereby using the text effects more flexibly.

The above description is merely an overview of the technical solutions of the present disclosure. Some preferred embodiments are described hereinafter in conjunction with drawings in order for a clearer understanding of the technical means of the present disclosure to implement the technical solutions, and to make the above and other objectives, features and advantages of the present disclosure clearer and easier to understand.

BRIEF DESCRIPTION OF THE DRAWINGS

The above and other features, advantages and aspects of the embodiments of the present disclosure will be more apparent in conjunction with the accompanying drawings and with reference to the following embodiments. Throughout the drawings, the same or similar reference numerals represent the same or similar elements. It should be understood that the drawings are schematic and the originals and elements are unnecessarily drawn to scale.

DETAILED DESCRIPTION OF THE EMBODIMENTS

The embodiments of the present disclosure are described in detail below with reference to the accompanying drawings. Although the drawings show some embodiments of the present disclosure, it should be understood that the present disclosure can be implemented in various forms and is not limited to the embodiments. The embodiments are provided for a more thorough and complete understanding of the present disclosure. It should be understood that the drawings and the embodiments in the present disclosure are only illustrative of the disclosure, and are not intended to limit the protection scope of the present disclosure.

It should be understood that the steps of the method according to the embodiments of the present disclosure may be performed in different orders, and/or be performed in parallel. In addition, the method embodiments may include additional steps and/or omit to perform the illustrated steps, not limiting the scope of the present disclosure.

The term "including" and its variants as used herein are open-ended includes, that is, "including but not limited to". The term "based on" means "based at least in part on." The term "one embodiment" means "at least one embodiment". The term "another embodiment" means "at least one additional embodiment". The term "some embodiments" means "at least some embodiments". Definitions of other terms are provided in the following description.

First Embodiment

Figure 1:
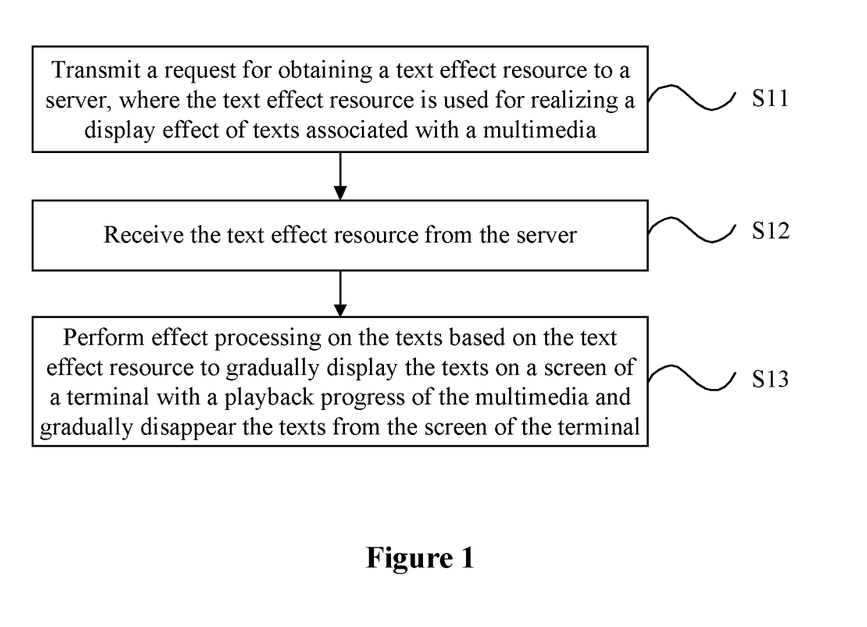
FIG. 1 is a flow chart of a method for text effect processing according to an embodiment of the present disclosure.

To solve the technical problem of inflexible text effect in the conventional technology, a method for text effect processing is provided according to an embodiment of the present disclosure. As shown in FIG. 1, the method for text effect processing includes the following steps S11 to S13.

In step S11, a request for obtaining a text effect resource is transmitted to a server, where the text effect resource is used for realizing a display effect of texts associated with a multimedia.

In the embodiment, the execution subject is a client installed on a terminal, for example, the execution subject may be a short video application or a music playing software. The terminal may be a mobile terminal (for example, a smart phone and a tablet computer) or a fixed terminal (for example, a desktop computer).

The multimedia may be a video, and the texts associated with the multimedia are the lines. The multimedia may be music, and the texts associated with the multimedia are lyrics.

The display effect may include zooming in the texts, zooming out the texts, gradually disappearing the texts from the screen of the terminal, gradually displaying the texts on the screen of the terminal, and the like.

Specifically, a multimedia option and/or a text effect resource option may be provided in an application interface of the client. For example, a multimedia list and/or a text effect resource list may be provided. The multimedia list may include multiple multimedia names, such as video names or music names. The text effect resource list may include effect information, such as zooming in or zooming out. With the multimedia option and/or the text effect resource option, the user may select a multimedia and/or a text effect resource on the client according to a requirement. Then, the multimedia and the texts associated with the multimedia may be obtained locally, or a request for obtaining a text effect resource may be transmitted to a server and the multimedia and the texts associated with the multimedia, such as music and lyrics corresponding to the music, are received from the server.

In step S12, the text effect resource is received from the server.

The server may be a third-party server for storing text effect resources. Alternatively, the server may be an application server corresponding to the client. The application server stores multimedia and texts associated with the multimedia in addition to storing the text effect resources.

In step S12, effect processing is performed on the texts based on the text effect resource to gradually display the texts on the screen of the terminal with the playback progress of the multimedia and gradually disappear the texts from the screen of the terminal.

Specifically, taking the multimedia as music and lyrics as an example, effect processing is performed on the lyrics based on the text effect resource from the server. During the playing of the music, the lyrics, with the playing of the music, are displayed on the screen of the terminal and then are gradually disappeared.

In the embodiment, the text effect resource is obtained from the server, and effect processing is performed on the texts based on the text effect resource to gradually display the texts on the screen of the terminal with the playback progress of the multimedia and gradually disappear the texts from the screen of the terminal. According to the present disclosure, the text effects resource can be obtained without updating the client, thereby using the text effects more flexibly.

In an embodiment, the step S13 includes the following steps S131 to S133.

In step S131, a time stamp corresponding to the playback progress of the multimedia and texts corresponding to the time stamp are obtained.

The timestamp represents a time period from an initial playback time instant to a current playback time instant.

Specifically, a corresponding relationship between the time stamp and the texts may be predetermined, then a time stamp corresponding to the playback progress of the multimedia is determined, and then the texts corresponding to the time stamp is obtained.

In step S132, a display transparency of the texts corresponding to the time stamp is determined based on the time stamp.

The display transparency may ranges from 0 to 1. In a case that the display transparency changes from 0 to 1, the texts are gradually displayed; and in a case that the display transparency changes from 1 to 0, the texts are gradually disappeared. The value of the display transparency is determined in real time based on the time stamp.

In step S133, effect processing is performed on the texts corresponding to the time stamp based on the display transparency to gradually display the texts on the screen of the terminal with the playback progress of the multimedia and gradually disappear the texts from the screen of the terminal.

Specifically, effect processing is performed the texts corresponding to each of the time stamps in the playback process of the multimedia based on the display transparency, so that the texts are displayed on the screen of the terminal with the playback progress of the multimedia and is gradually disappeared from the screen of the terminal.

In an embodiment, the method further includes the following step S14.

In step S14, a displacement map is generated based on a resolution of the terminal. The displacement map includes an initial displacement of each of pixel points. For example, in a case that the screen of the terminal has a resolution of 720*1280, a displacement map with a size of 720*1280 is generated.

Accordingly, the step S133 includes the following steps S1331 to S1333.

In step S1331, a playback percentage is determined based on the time stamp. The playback percentage is a ratio of a current playback progress of the texts to a total progress.

In step S1332, a target displacement is determined based on the playback percentage and the initial displacement.

The target displacement may be a product of the playback percentage and the initial displacement.

In step S1333, effect processing is performed on the texts corresponding to the time stamp based on the display transparency and the target displacement to gradually display the texts on the screen of the terminal with the playback progress of the multimedia and gradually disappear the texts from the screen of the terminal.

Specifically, a product of the display transparency and a pixel value of each of the pixel points in the image of the texts are used as a pixel value of a pixel point corresponding to the target displacement. The display transparency changes in real time with the playback progress, that is, the display transparency gradually changes from 1 to 0, so that the texts are displayed on the screen of the terminal with the playback progress of the multimedia and is gradually disappeared from the screen of the terminal.

In an embodiment, the step S14 includes the following steps S141 to S143.

In step S141, a template picture is generated based on the resolution of the terminal. The template picture includes n feature points, and n is a positive integer.

In step S142, triangulation processing is performed on the template picture based on the feature points to obtain m triangles, where m is a positive integer.

In step S143, the displacement map is generated based on a displacement of each of pixel points in the m triangles.

In an embodiment, the step S143 includes the following steps S1431 to S1435.

In step S1431, each of the triangles is traversed, and a triangle being currently traversed is determined as a current triangle.

In step S1432, three vertices of the current triangle are moved to obtain three target vertices.

Specifically, each of the three vertices of the current triangle may be slightly disturbed, within a predetermined range and toward a direction, to obtain the three target vertices.

In step S1433, an affine transformation matrix of the current triangle is obtained based on the three vertices and the three target vertices.

In step S1434, a displacement of each of pixel points in the current triangle is calculated based on the affine transformation matrix. The displacement includes a displacement in an x-axis direction and a displacement in a y-axis direction.

In step S1435, the displacement map is generated based on the displacement of each of the pixel points in the m triangles.

In an embodiment, the step S133 includes the following steps S1334 to S1336.

In step S1334, the texts corresponding to the time stamp is typeset based on a typesetting parameter in the text effect resource, and generating a bitmap.

The text effect resource includes the typesetting parameter.

The typesetting parameter includes font, font size, font style, color, shadow, underline and the like.

The bitmap is composed of the pixels of the texts. The pixels are the smallest information units of the bitmap and are stored in an image grid. Each of the pixels has a position and a color value. The information, such as a position of a pixel on the screen of the terminal and a color of the pixel, of each of the pixels of the texts are recorded in the order from left to right and top to bottom.

In step S1335, a pixel value of each of pixel points in the bitmap is determined based on the display transparency.

For example, the display transparency is multiplied by the initial pixel value of each of the pixel points in the image of the texts to obtain the pixel value of each of pixel points in the bitmap.

In step S1336, the texts are displayed on the screen of the terminal, each of the pixel points is moved along the target displacement, and the texts are gradually disappeared with the playback progress of the multimedia.

In rendering, the target displacement of each of the pixel points is obtained, and rendering is performed in OpenGL (Open Graphics Library) to accelerate performance.

In an embodiment, the method further includes the following steps S15 and S16.

In step S15, a local script program is run based on a script file in the text effect resource.

In step S16, effect processing is performed on the texts based on the script program to gradually display the texts on the screen of the terminal with the playback progress of the multimedia and gradually disappear the texts from the screen of the terminal.

Specifically, the script program may be written in advance and is configured in the client, and the script text corresponding to the script program is included in the text effect resource. After receiving the text effect resource from the server, effect processing is performed on the texts by running the script program, so that the texts are displayed on the screen of the terminal with the playback progress of the multimedia and is gradually disappeared from the screen of the terminal.

Second Embodiment

Figure 2:
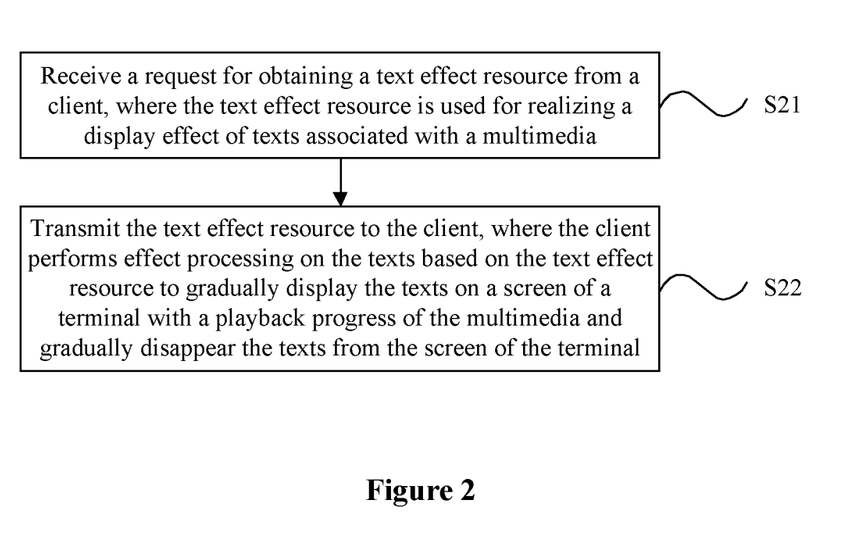
FIG. 2 is a flow chart of a method for text effect processing according to an embodiment of the present disclosure.

To solve the technical problem of inflexible text effect in the conventional technology, a method for text effect processing is provided according to an embodiment of the present disclosure. As shown in FIG. 2, the method for text effect processing includes the following steps S21 and S22.

In step S21, a request for obtaining a text effect resource is received from a client, where the text effect resource is used for realizing a display effect of texts associated with a multimedia.

In step S22, the text effect resource is transmitted to the client. The client performs effect processing on the texts based on the text effect resource to gradually display the texts on a screen of a terminal with a playback progress of the multimedia and gradually disappear the texts from the screen of the terminal.

In the embodiment, the execution subject is the server. Explanations and implementations of the terms in the embodiment may refer to the first embodiment above, which are repeated herein.

In the embodiment, the text effect resource is transmitted to the client, and the client performs effect processing on the texts based on the text effect resource to gradually display the texts on the screen of the terminal with the playback progress of the multimedia and gradually disappear the texts from the screen of the terminal. According to the present disclosure, the text effects resource can be obtained without updating the client, thereby using the text effects more flexibly.

It should be understood by those skilled in the art that, based on the above embodiments, obvious modifications (for example, a combination of the listed modes) or equivalent substitutions may be made.

Although the steps of the method for text effect processing in the embodiments are described in the above order, those skilled in the art should understand that the steps according to the embodiments of the present disclosure are not necessarily executed in the above order, and they may be performed in a reversed, parallel, interleaved manner or other orders. Besides, on the basis of the above steps, those skilled in the art may add other steps. These obvious modifications or equivalents shall fall within the protection scope of the present disclosure, and are not repeated hereinafter.

The apparatus embodiments according to the present disclosure are described below. The apparatus embodiments can perform the steps of the method embodiments of the present disclosure. For ease of description, only the parts related to the embodiments of the present disclosure are shown. For specific technical details that are not disclosed, one may refer to the method embodiments of the present disclosure.

Third Embodiment

Figure 3:
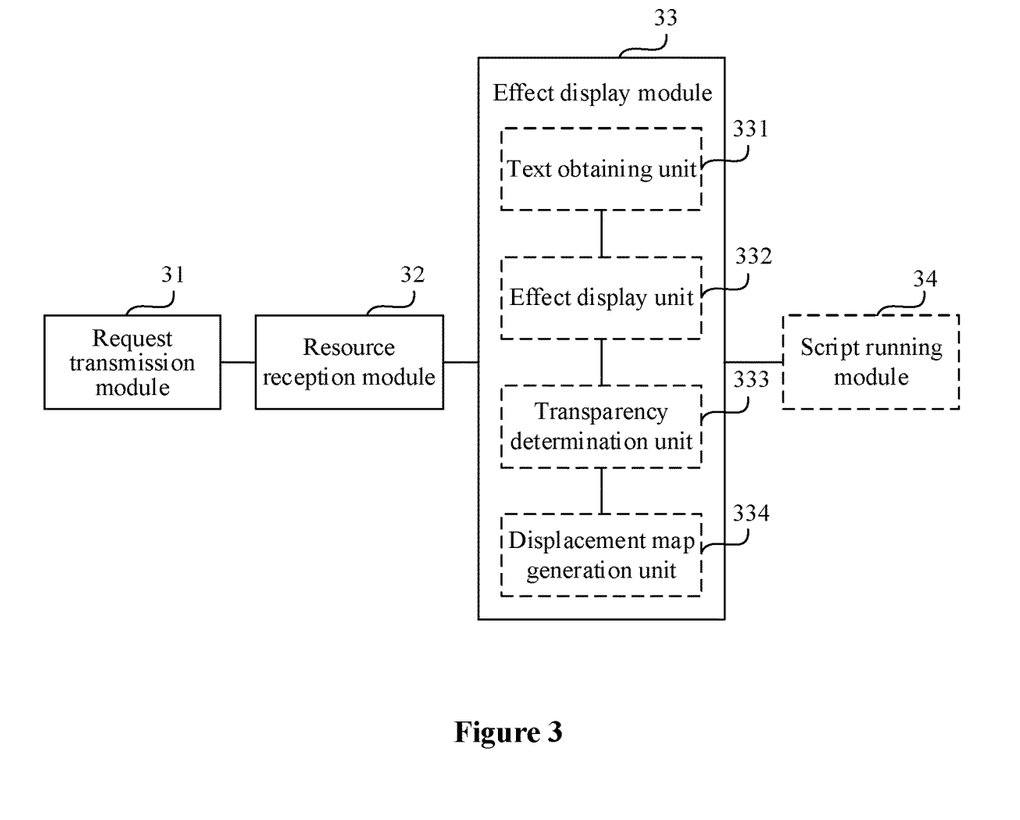
FIG. 3 is a schematic structural diagram of an apparatus for text effect processing according to an embodiment of the present disclosure.

To solve the technical problem of inflexible text effect in the conventional technology, an apparatus for text effect processing is provided according to an embodiment of the present disclosure. The apparatus is configured to perform the steps of the method text effect processing according to the first embodiment. As shown in FIG. 3, the apparatus includes a request transmission module 31, a resource reception module 32, and an effect display module 33.

The request transmission module 31 is configured to transmit a request for obtaining a text effect resource to a server, where the text effect resource is used for realizing a display effect of texts associated with a multimedia.

The resource reception module 32 is configured to receive the text effect resource from the server.

The effect display module 33 is configured to perform effect processing on the texts based on the text effect resource to gradually display the texts on a screen of a terminal with a playback progress of the multimedia and gradually disappear the texts from the screen of the terminal.

In a further embodiment, the effect display module 33 includes: a text obtaining unit 331, a transparency determination unit 332, and an effect display unit 333.

The text obtaining unit 331 is configured to obtain a time stamp corresponding to the playback progress of the multimedia and texts corresponding to the time stamp.

The transparency determination unit 332 is configured to determine a display transparency of the texts corresponding to the time stamp based on the time stamp.

The effect display unit 333 is configured to perform effect processing on the texts corresponding to the time stamp based on the display transparency to gradually display the texts on the screen of the terminal with the playback progress of the multimedia and gradually disappear the texts from the screen of the terminal.

In a further embodiment, the effect display module 33 further includes: a displacement map generation unit 334.

The displacement map generation unit 334 is configured to generate a displacement map based on a resolution of the terminal, where the displacement map includes an initial displacement of each of pixel points.

Accordingly, the effect display unit 333 is configured to: determine a playback percentage based on the time stamp, where the playback percentage is a ratio of a current playback progress of the texts to a total progress; determine a target displacement based on the playback percentage and the initial displacement; and perform effect processing on the texts corresponding to the time stamp based on the display transparency and the target displacement to gradually display the texts on the screen of the terminal with the playback progress of the multimedia and gradually disappear the texts from the screen of the terminal.

In a further embodiment, the effect display unit 333 is configured to: typeset the texts corresponding to the time stamp based on a typesetting parameter in the text effect resource and generate a bitmap; determine a pixel value of each of pixel points in the bitmap based on the display transparency; and display the texts on the screen of the terminal, move each of the pixel points along the target displacement, and gradually disappear the texts with the playback progress of the multimedia.

In a further embodiment, the displacement map generation unit 334 is configured to: generate a template picture based on the resolution of the terminal, where the template picture includes n feature points, and n is a positive integer; perform triangulation processing on the template picture based on the feature points to obtain m triangles, where m is a positive integer; and generate the displacement map based on a displacement of each of pixel points in the m triangles.

In a further embodiment, the displacement map generation unit 334 is configured to: traverse each of the triangles, and determine a triangle being currently traversed as a current triangle; move three vertices of the current triangle to obtain three target vertices; obtain an affine transformation matrix of the current triangle based on the three vertices and the three target vertices; calculate a displacement of each of pixel points in the current triangle based on the affine transformation matrix; and generate the displacement map based on the displacement of each of the pixel points in the m triangles.

In a further embodiment, the apparatus includes: a script running module 34. The script running module 34 is configured to run a local script program based on a script file in the text effect resource; and perform effect processing on the texts based on the script program to gradually display the texts on the screen of the terminal with the playback progress of the multimedia and gradually disappear the texts from the screen of the terminal.

For detailed descriptions of the operation principles and achieved technical effects of the apparatus for text effect processing in the embodiments, one may refer to the descriptions of the method for text effect processing in the above embodiments, which are not repeated herein.

Fourth Embodiment

Figure 4:
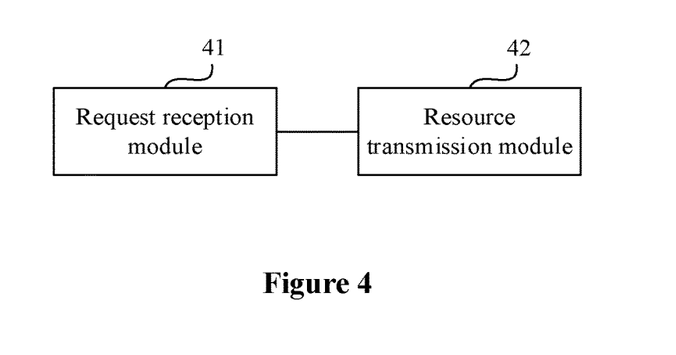
FIG. 4 is a schematic structural diagram of an apparatus for text effect processing according to an embodiment of the present disclosure.

To solve the technical problem of inflexible text effect in the conventional technology, an apparatus for text effect processing is provided according to an embodiment of the present disclosure. The apparatus is configured to perform the steps of the method text effect processing according to the second embodiment. As shown in FIG. 4, the apparatus includes a request reception module 41 and a resource transmission module 42.

The request reception module 41 is configured to receive a request for obtaining a text effect resource from a client, where the text effect resource is used for realizing a display effect of texts associated with a multimedia.

The resource transmission module 42 is configured to transmit the text effect resource to the client. The client performs effect processing on the texts based on the text effect resource to gradually display the texts on a screen of a terminal with a playback progress of the multimedia and gradually disappear the texts from the screen of the terminal.

For detailed descriptions of the operation principles and achieved technical effects of the apparatus for text effect processing in the embodiments, one may refer to the descriptions of the method for text effect processing in the above embodiments, which are not repeated herein.

Fifth Embodiment

Figure 5:
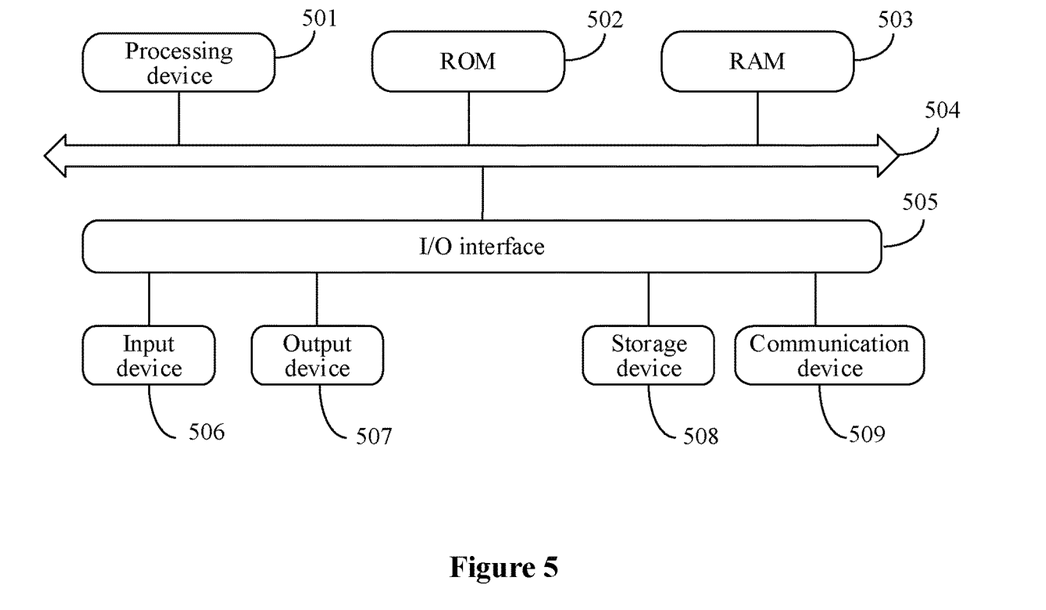
FIG. 5 is a schematic structural diagram of an electronic device according to an embodiment of the present disclosure.

FIG. 5 shows a schematic structural diagram of an electronic device 500 suitable for implementing the embodiments of the present disclosure. The terminal devices according to the embodiments of the present disclosure may include, but are not limited to, mobile terminals, such as mobile phones, laptops, digital broadcast receivers, PDAs (personal digital assistants), PADs (tablet PCs), PMPs (portable multimedia players), vehicle-mounted terminals (such as in-vehicle navigation terminals) and the like, and fixed terminals such as digital TVs, desktop computers, and the like. The electronic device shown in FIG. 5 is only exemplary, and should not indicate any limitation to the function and application scope of the embodiments of the present disclosure.

As shown in FIG. 5, the electronic device 500 may include a processing device 501, such as a central processing unit (CPU) or a graphics processor, which may execute various operations and processing through a program stored in a Read Only Memory (ROM) 502 or a program loaded from the storage device 508 into a Random Access Memory (RAM) 503. The RAM 503 is further configured to store various programs and data required by the electronic device 500. The processing device 501, the ROM 502 and the RAM 503 are connected to each other through a bus 504. An Input/output (I/O) interface 505 is also connected to the bus 504.

Generally, the I/O interface 505 may be connected to: an input device 506, such as a touch screen, a touch panel, a keyboard, a mouse, a camera, a microphone, an accelerometer, and a gyroscope; an output device 507, such as a liquid crystal display (LCD), a speaker, and a vibrator; a storage device 506 such as a magnetic tape and a hard disk; and a communication device 509. The communication device 509 enables wireless or wired communication between the electronic device 500 and other devices for data exchanging. Although FIG. 5 shows an electronic device 500 having various components, it should be understood that the illustrated components are not necessarily required to all be implemented or included. Alternatively, more or fewer components may be implemented or included.

Particularly, according to an embodiment of the present disclosure, the process described above in conjunction with flow charts may be implemented as a computer program. For example, a computer program product is further provided as an embodiment in the present disclosure, including a computer program carried on a non-transitory computer readable medium. The computer program includes program code for performing the method shown in the flow charts. In the embodiment, the computer program may be downloaded and installed from the network via the communication device 509, or installed from the storage device 506, or installed from the ROM 502. When the computer program is executed by the processing device 501, the above-mentioned functions defined in the method according to the embodiment of the present disclosure are performed.

It is to be noted that, the computer readable medium mentioned herein may be a computer readable signal medium or a computer readable storage medium or any combination thereof. The computer readable storage medium may be but is not limited to, a system, an apparatus, or a device in an electronic, magnetic, optical, electromagnetic, infrared, or semi-conductive form, or any combination thereof. The computer readable storage medium may be, but is not limited to, an electrical connection with one or more wires, a portable computer disk, a hard disk, a random access memory (RAM), a read-only memory (ROM), an erasable programmable read-only memory (EPROM or flash memory), an optical fiber, a portable compact disc read-only memory (CD-ROM), a light storage device, a magnetic storage device or any combination thereof. In the embodiment of the present disclosure, the computer readable storage medium may be any tangible medium containing or storing a program, and the program may be used by or in combination with an instruction execution system, apparatus, or device. In the embodiment of the present disclosure, the computer readable signal medium may be a data signal transmitted in a baseband or transmitted as a part of a carrier wave and carrying computer readable program codes. The transmitted data signal may be in various forms, including but not limited to an electromagnetic signal, an optical signal or any proper combination thereof. The computer readable signal medium may be any computer readable medium other than the computer readable storage medium and can send, propagate or transmit programs to be used by or with an instruction execution system, apparatus or device. The program codes stored in the computer readable medium may be transmitted via any proper medium including but not limited to: wired, optical fiber cable, radio frequency (RF), or any suitable combination of the foregoing.

In some embodiments, the client and the server may perform communication using any currently known or future developed network protocol such as HTTP (HyperText Transfer Protocol), and may be interconnected with any form or medium of digital data communication (for example, a communication network). The communication network embodiments include local area networks ("LANs"), wide area networks ("WANs"), internet, end-to-end networks (for example, ad hoc end-to-end networks), and any networks currently known or developed in the future.

The computer readable medium may be incorporated in the electronic device, or may exist alone without being assembled into the electronic device.

The computer readable medium carries one or more programs. The one or more programs, when being executed by the electronic device, cause the electronic to: transmit a request for obtaining a text effect resource to a server, where the text effect resource is used for realizing a display effect of texts associated with a multimedia; receive the text effect resource from the server; and perform effect processing on the texts based on the text effect resource to gradually display the texts on a screen of a terminal with a playback progress of the multimedia and gradually disappear the texts from the screen of the terminal.

Computer program code for performing operations of the present disclosure may be written in one or more programming languages, or a combination of the foregoing, and the programming language includes object oriented programming languages, such as Java, Smalltalk, and C++, also includes conventional procedural programming languages, such as "C" language or similar programming languages. The program code may be executed entirely on a user's computer, or be executed partly on the user's computer, or be executed as a stand-alone software package, or be executed partly on the user's computer and partly on a remote computer, or be executed entirely on the remote computer or server. In the case that the execution of the program code involves a remote computer, the remote computer can be connected to a user's computer via any kind of network, including a local area network (LAN) or a wide area network (WAN), or can be connected to an external computer (for example, via an Internet providing by an Internet service provider).

The flow charts and schematic diagrams in the Figures shows the architecture, functionality and operation of possible implementations of the products of system, method and computer program provided according to the embodiments of the present disclosure. Each block in the flow charts or schematic diagrams can represent a module, a program segment, or a part of code, and the module, the program segment, or the part of code includes one or more executable instructions for implementing specified logical functions. It should be noted that in some alternative implementations, the functions noted in the blocks may be implemented in a different order than those illustrated in the Figures. For example, two blocks shown in succession may in fact be executed substantially in parallel, and they may sometimes be executed in a reverse order, depending upon the functionality involved. It also should be noted that each block in the schematic diagrams and/or flow charts, and combinations of blocks in the schematic diagrams and/or flowcharts, can be implemented by a dedicated hardware-based system which is configured to implement specified functions or operations, or can be implemented by using a combination of dedicated hardware and computer instructions.

The units mentioned in the description of the embodiments of the present disclosure may be implemented by means of software, or otherwise by means of hardware. In some circumstances, the name of a unit does not constitute a limitation on the unit itself.

The functions described above in this application may be performed at least in part by one or more hardware logic components. For example, without limitation, exemplary types of hardware logic components that can be used include: Field Programmable Gate Array (FPGA), Application Specific Integrated Circuit (ASIC), Application Specific Standard Product (ASSP), System on Chip (SOC), Complex Programmable Logical device (CPLD) and so on.

In the present disclosure, a machine-readable medium may be a tangible medium, which may contain or store a program used by the instruction execution system, apparatus, or device or a program used in combination with the instruction execution system, apparatus, or device. The machine-readable medium may be a machine-readable signal medium or a machine-readable storage medium. The machine-readable medium may include, but is not limited to, an electronic, magnetic, optical, electromagnetic, infrared, or semiconductor system, apparatus or device, or any suitable combination of thereof. The machine-readable storage media, for example, includes an electrical connection based on one or more wires, a portable computer disk, a hard drive, a random access memory (RAM), a read-only memory (ROM), an erasable programmable read-only memory (EPROM or flash memory), an optical fiber, a portable compact disk read-only memory (CD-ROM), an optical storage device, a magnetic storage device, or any suitable combination of thereof.

According to one or more embodiments of the present disclosure, a method for text effect processing is provided. The method includes: transmitting a request for obtaining a text effect resource to a server, where the text effect resource is used for realizing a display effect of texts associated with a multimedia; receiving the text effect resource from the server; and performing effect processing on the texts based on the text effect resource to gradually display the texts on a screen of a terminal with a playback progress of the multimedia and gradually disappear the texts from the screen of the terminal.

In a further embodiment, the performing effect processing on the texts based on the text effect resource to gradually display the texts on a screen of a terminal with a playback progress of the multimedia and gradually disappear the texts from the screen of the terminal includes: obtaining a time stamp corresponding to the playback progress of the multimedia and texts corresponding to the time stamp; determining a display transparency of the texts corresponding to the time stamp based on the time stamp; and performing effect processing on the texts corresponding to the time stamp based on the display transparency to gradually display the texts on the screen of the terminal with the playback progress of the multimedia and gradually disappear the texts from the screen of the terminal.

In a further embodiment, the method further includes: generating a displacement map based on a resolution of the terminal, where the displacement map includes an initial displacement of each of pixel points. Accordingly, the performing effect processing on the texts corresponding to the time stamp based on the display transparency to gradually display the texts on the screen of the terminal with the playback progress of the multimedia and gradually disappear the texts from the screen of the terminal includes: determining a playback percentage based on the time stamp, where the playback percentage is a ratio of a current playback progress of the texts to a total progress; determining a target displacement based on the playback percentage and the initial displacement; and performing effect processing on the texts corresponding to the time stamp based on the display transparency and the target displacement to gradually display the texts on the screen of the terminal with the playback progress of the multimedia and gradually disappear the texts from the screen of the terminal.

In a further embodiment, the performing effect processing on the texts corresponding to the time stamp based on the display transparency and the target displacement to gradually display the texts on the screen of the terminal with the playback progress of the multimedia and gradually disappear the texts from the screen of the terminal includes: typesetting the texts corresponding to the time stamp based on a typesetting parameter in the text effect resource, and generating a bitmap; determining a pixel value of each of pixel points in the bitmap based on the display transparency; and displaying the text on the screen of the terminal, moving each of the pixel points along the target displacement, and gradually disappearing the texts with the playback progress of the multimedia.

In a further embodiment, the generating a displacement map based on a resolution of the terminal includes: generating a template picture based on the resolution of the terminal, where the template picture includes n feature points, and n is a positive integer; performing triangulation processing on the template picture based on the feature points to obtain m triangles, where m is a positive integer; and generating the displacement map based on a displacement of each of pixel points in the m triangles.

In a further embodiment, the generating the displacement map based on a displacement of each of pixel points in the m triangles includes: traversing each of the triangles, and determining a triangle being currently traversed as a current triangle; moving three vertices of the current triangle to obtain three target vertices; obtaining an affine transformation matrix of the current triangle based on the three vertices and the three target vertices; calculating a displacement of each of pixel points in the current triangle based on the affine transformation matrix; and generating the displacement map based on the displacement of each of the pixel points in the m triangles.

In a further embodiment, the method further includes: running a local script program based on a script file in the text effect resource; and performing effect processing on the texts based on the script program to gradually display the texts on the screen of the terminal with the playback progress of the multimedia and gradually disappear the texts from the screen of the terminal.

According to one or more embodiments of the present disclosure, a method for text effect processing is provided. The method includes: receiving a request for obtaining a text effect resource from a client, where the text effect resource is used for realizing a display effect of texts associated with a multimedia; and transmitting the text effect resource to the client, where the client performs effect processing on the texts based on the text effect resource to gradually display the texts on a screen of a terminal with a playback progress of the multimedia and gradually disappear the texts from the screen of the terminal.

According to one or more embodiments of the present disclosure, an apparatus for text effect processing is provided. The apparatus includes: a request transmission module configured to transmit a request for obtaining a text effect resource to a server, where the text effect resource is used for realizing a display effect of texts associated with a multimedia; a resource reception module configured to receive the text effect resource from the server; and an effect display module configured to perform effect processing on the texts based on the text effect resource to gradually display the texts on a screen of a terminal with a playback progress of the multimedia and gradually disappear the texts from the screen of the terminal.

In a further embodiment, the effect display module includes: a text obtaining unit configured to obtain a time stamp corresponding to the playback progress of the multimedia and texts corresponding to the time stamp; a transparency determination unit configured to determine a display transparency of the texts corresponding to the time stamp based on the time stamp; and an effect display unit configured to perform effect processing on the texts corresponding to the time stamp based on the display transparency to gradually display the texts on the screen of the terminal with the playback progress of the multimedia and gradually disappear the texts from the screen of the terminal.

In a further embodiment, the effect display module further includes: a displacement map generation unit configured to generate a displacement map based on a resolution of the terminal, where the displacement map includes an initial displacement of each of pixel points. Accordingly, the effect display unit is configured to: determine a playback percentage based on the time stamp, where the playback percentage is a ratio of a current playback progress of the texts to a total progress; determine a target displacement based on the playback percentage and the initial displacement; and perform effect processing on the texts corresponding to the time stamp based on the display transparency and the target displacement to gradually display the texts on the screen of the terminal with the playback progress of the multimedia and gradually disappear the texts from the screen of the terminal.

In a further embodiment, the effect display unit is configured to: typeset the texts corresponding to the time stamp based on a typesetting parameter in the text effect resource and generate a bitmap; determine a pixel value of each of pixel points in the bitmap based on the display transparency; and display the texts on the screen of the terminal, move each of the pixel points along the target displacement, and gradually disappear the texts with the playback progress of the multimedia.

In a further embodiment, the displacement map generation unit is configured to: generate a template picture based on the resolution of the terminal, where the template picture includes n feature points, and n is a positive integer; perform triangulation processing on the template picture based on the feature points to obtain m triangles, where m is a positive integer; and generate the displacement map based on a displacement of each of pixel points in the m triangles.

In a further embodiment, the displacement map generation unit is configured to: traverse each of the triangles, and determine a triangle being currently traversed as a current triangle; move three vertices of the current triangle to obtain three target vertices; obtain an affine transformation matrix of the current triangle based on the three vertices and the three target vertices; calculate a displacement of each of pixel points in the current triangle based on the affine transformation matrix; and generate the displacement map based on the displacement of each of the pixel points in the m triangles.

In a further embodiment, the apparatus includes: a script running module. The script running module is configured to run a local script program based on a script file in the text effect resource; and perform effect processing on the texts based on the script program to gradually display the texts on the screen of the terminal with the playback progress of the multimedia and gradually disappear the texts from the screen of the terminal.

According to one or more embodiments of the present disclosure, an apparatus for text effect processing is provided. The apparatus includes: a request reception module and a resource transmission module. The request reception module is configured to receive a request for obtaining a text effect resource from a client, where the text effect resource is used for realizing a display effect of texts associated with a multimedia. The resource transmission module is configured to transmit the text effect resource to the client. The client performs effect processing on the texts based on the text effect resource to gradually display the texts on a screen of a terminal with a playback progress of the multimedia and gradually disappear the texts from the screen of the terminal.

According to one or more embodiments of the present disclosure, an electronic device is provided. The electronic device includes: a memory and a processor. The memory stores non-transitory computer readable instructions. The processor is configured to perform, when executing the computer readable instructions, the method for text effect processing.

According to one or more embodiments of the present disclosure, a computer readable storage medium is provided. The computer readable storage medium stores non-transitory computer readable instructions. The non-transitory computer readable instructions, when executed by a computer, cause the computer to perform the method for text effect processing.

The above description includes merely preferred embodiments of the present disclosure and explanations of technical principles used. Those skilled in the art should understand that the scope of the present disclosure is not limited to technical solutions formed by a specific combination of the above technical features, but covers other technical solutions formed by any combination of the above technical features or equivalent features thereof without departing from the concept of the present disclosure. For example, a technical solution formed by interchanging the above features with technical features having similar functions as disclosed (but not limited thereto) is also covered in the scope of the present disclosure.

In addition, although the operations are described in a specific order, it should not be understood that these operations are to be performed in the specific order shown or performed in a sequential order. Under certain circumstances, multitasking and parallel processing may be advantageous. Although the specific implementation details are described above, these implementation details should not be construed as limiting the scope of the present disclosure. The features described in multiple separate embodiments may be implemented in combination in a separate embodiment. Conversely, the features described in a separate embodiment may be implemented in multiple embodiments individually or in any suitable sub-combination.

Although the solutions according to the present disclosure have been described in language specific to structural features and/or logical actions of the method, it should be understood that the solutions defined in the appended claims are unnecessarily limited to the specific features or actions described above. The specific features and actions described above are merely exemplary forms of implementing the claims.

The invention claimed is:

1. A method for text effect processing, comprising:
   transmitting a request for obtaining a text effect resource to a server, wherein the text effect resource is used for realizing a display effect of texts associated with a multimedia;
   receiving the text effect resource from the server; and
   performing effect processing on the texts based on the text effect resource to gradually display the texts on a screen of a terminal with a playback progress of the multimedia and gradually disappear the texts from the screen of the terminal, wherein the performing effect processing on the texts based on the text effect resource further comprises:
   obtaining a time stamp corresponding to the playback progress of the multimedia and texts corresponding to the time stamp,
   determining display transparency of the texts corresponding to the time stamp based on the time stamp,
   generating a displacement map based on a resolution of the terminal, wherein the displacement map comprises an initial displacement of each of pixel points,
   determining a playback percentage based on the time stamp, wherein the playback percentage is a ratio of a current playback progress of the texts to a total progress,
   determining a target displacement based on the playback percentage and the initial displacement, and
   performing effect processing on the texts corresponding to the time stamp based on the display transparency and the target displacement to gradually display the texts on the screen of the terminal with the playback progress of the multimedia and gradually disappear the texts from the screen of the terminal.

2. The method according to claim 1, wherein the performing effect processing on the texts corresponding to the time stamp based on the display transparency and the target displacement to gradually display the texts on the screen of the terminal with the playback progress of the multimedia and gradually disappear the texts from the screen of the terminal comprises:
   typesetting the texts corresponding to the time stamp based on a typesetting parameter in the text effect resource, and generating a bitmap;
   determining a pixel value of each of pixel points in the bitmap based on the display transparency; and
   displaying the text on the screen of the terminal, moving each of the pixel points along the target displacement, and gradually disappearing the texts with the playback progress of the multimedia.

3. The method according to claim 1, wherein the generating a displacement map based on a resolution of the terminal comprises:
   generating a template picture based on the resolution of the terminal, wherein the template picture comprises n feature points, and n is a positive integer;
   performing triangulation processing on the template picture based on the feature points to obtain m triangles, wherein m is a positive integer; and generating the displacement map based on a displacement of each of pixel points in the m triangles.

4. The method according to claim 3, wherein the generating the displacement map based on a displacement of each of pixel points in them triangles comprises:
   traversing each of the triangles, and determining a triangle being currently traversed as a current triangle;
   moving three vertices of the current triangle to obtain three target vertices;
   obtaining an affine transformation matrix of the current triangle based on the three vertices and the three target vertices;
   calculating a displacement of each of pixel points in the current triangle based on the affine transformation matrix; and
   generating the displacement map based on the displacement of each of the pixel points in the m triangles.

5. The method according to claim 1, further comprising:
   running a local script program based on a script file in the text effect resource; and
   performing effect processing on the texts based on the script program to gradually display the texts on the screen of the terminal with the playback progress of the multimedia and gradually disappear the texts from the screen of the terminal.

6. An apparatus for text effect processing, comprising:
   at least one processor; and
   at least one memory communicatively coupled to the at least one processor and storing instructions that upon execution by the at least one processor cause the apparatus to:
   transmit a request for obtaining a text effect resource to a server, wherein the text effect resource is used for realizing a display effect of texts associated with a multimedia;
   receive the text effect resource from the server; and
   perform effect processing on the texts based on the text effect resource to gradually display the texts on a screen of a terminal with a playback progress of the multimedia and gradually disappear the texts from the screen of the terminal, wherein performing effect processing on the texts based on the text effect resource further comprises:
   obtaining a time stamp corresponding to the playback progress of the multimedia and texts corresponding to the time stamp,
   determining display transparency of the texts corresponding to the time stamp based on the time stamp,
   generating a displacement map based on a resolution of the terminal, wherein the displacement map comprises an initial displacement of each of pixel points,
   determining a playback percentage based on the time stamp, wherein the playback percentage is a ratio of a current playback progress of the texts to a total progress,
   determining a target displacement based on the playback percentage and the initial displacement, and
   performing effect processing on the texts corresponding to the time stamp based on the display transparency and the target displacement to gradually display the texts on the screen of the terminal with the playback progress of the multimedia and gradually disappear the texts from the screen of the terminal.

7. The apparatus of claim 6, the at least one memory further storing instructions that upon execution by the at least one processor cause the apparatus to:
   typeset the texts corresponding to the time stamp based on a typesetting parameter in the text effect resource, and generating a bitmap;
   determine a pixel value of each of pixel points in the bitmap based on the display transparency; and
   display the text on the screen of the terminal, moving each of the pixel points along the target displacement, and gradually disappearing the texts with the playback progress of the multimedia.

8. The apparatus of claim 6, the at least one memory further storing instructions that upon execution by the at least one processor cause the apparatus to:
   generate a template picture based on the resolution of the terminal, wherein the template picture comprises n feature points, and n is a positive integer;
   perform triangulation processing on the template picture based on the feature points to obtain m triangles, wherein m is a positive integer; and
   generate the displacement map based on a displacement of each of pixel points in the m triangles.

9. The apparatus of claim 8, the at least one memory further storing instructions that upon execution by the at least one processor cause the apparatus to:
   traverse each of the triangles, and determining a triangle being currently traversed as a current triangle;
   move three vertices of the current triangle to obtain three target vertices;
   obtain an affine transformation matrix of the current triangle based on the three vertices and the three target vertices;
   calculate a displacement of each of pixel points in the current triangle based on the affine transformation matrix; and
   generate the displacement map based on the displacement of each of the pixel points in the m triangles.

10. The apparatus of claim 6, the at least one memory further storing instructions that upon execution by the at least one processor cause the apparatus to:
    run a local script program based on a script file in the text effect resource; and
    perform effect processing on the texts based on the script program to gradually display the texts on the screen of the terminal with the playback progress of the multimedia and gradually disappear the texts from the screen of the terminal.

11. A non-transitory computer readable storage medium, storing non-transitory computer readable instructions, wherein the non-transitory computer readable instructions, when executed by a computer, cause the computer to:
    transmit a request for obtaining a text effect resource to a server, wherein the text effect resource is used for realizing a display effect of texts associated with a multimedia;
    receive the text effect resource from the server; and
    perform effect processing on the texts based on the text effect resource to gradually display the texts on a screen of a terminal with a playback progress of the multimedia and gradually disappear the texts from the screen of the terminal, wherein performing effect processing on the texts based on the text effect resource further comprises:
    obtaining a time stamp corresponding to the playback progress of the multimedia and texts corresponding to the time stamp,
    determining display transparency of the texts corresponding to the time stamp based on the time stamp, generating a displacement map based on a resolution of the terminal, wherein the displacement map comprises an initial displacement of each of pixel points, determining a playback percentage based on the time stamp, wherein the playback percentage is a ratio of a current playback progress of the texts to a total progress, determining a target displacement based on the playback percentage and the initial displacement, and performing effect processing on the texts corresponding to the time stamp based on the display transparency and the target displacement to gradually display the texts on the screen of the terminal with the playback progress of the multimedia and gradually disappear the texts from the screen of the terminal.

12. The non-transitory computer readable storage medium of claim 11, wherein the non-transitory computer readable instructions, when executed by the computer, further cause the computer to:

typeset the texts corresponding to the time stamp based on a typesetting parameter in the text effect resource, and generating a bitmap;

determine a pixel value of each of pixel points in the bitmap based on the display transparency; and display the text on the screen of the terminal, moving each of the pixel points along the target displacement, and gradually disappearing the texts with the playback progress of the multimedia.

13. The non-transitory computer readable storage medium of claim 11, wherein the non-transitory computer readable instructions, when executed by the computer, further cause the computer to:

generate a template picture based on the resolution of the terminal, wherein the template picture comprises n feature points, and n is a positive integer;

perform triangulation processing on the template picture based on the feature points to obtain m triangles, wherein m is a positive integer; and generate the displacement map based on a displacement of each of pixel points in the m triangles.

14. The non-transitory computer readable storage medium of claim 13, wherein the non-transitory computer readable instructions, when executed by the computer, further cause the computer to:

traverse each of the triangles, and determining a triangle being currently traversed as a current triangle;

move three vertices of the current triangle to obtain three target vertices;

obtain an affine transformation matrix of the current triangle based on the three vertices and the three target vertices;

calculate a displacement of each of pixel points in the current triangle based on the affine transformation matrix; and generate the displacement map based on the displacement of each of the pixel points in the m triangles.

15. The non-transitory computer readable storage medium of claim 11, wherein the non-transitory computer readable instructions, when executed by the computer, further cause the computer to:

run a local script program based on a script file in the text effect resource; and perform effect processing on the texts based on the script program to gradually display the texts on the screen of the terminal with the playback progress of the multimedia and gradually disappear the texts from the screen of the terminal.

* * * * *